(12) United States Patent  (10) Patent No.: US 9,135,052 B2
Luxenberg et al. (45) Date of Patent: Sep. 15, 2015

(54) DISTRIBUTED MULTIPLE MONITOR DISPLAY SPLIT USING MULTIPLE CLIENT DEVICES IN A VIRTUALIZATION SYSTEM

(71) Applicant: Red Hat Israel, Ltd., Raanana (IL)

(72) Inventors: Roni Luxenberg, Raanana (IL); Uri Lublin, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 318 days.

(21) Appl. No.: 13/669,554

(22) Filed: Nov. 6, 2012

(65) Prior Publication Data

US 2014/0130041 A1 May 8, 2014

(51) Int. Cl.
G06F 9/455 (2006.01)
G06F 9/44 (2006.01)

(52) U.S. Cl.
CPC .......... *G06F 9/45558* (2013.01); *G06F 9/4445* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 2002/0029277 A1* | 3/2002 | Simpson-Young et al. | 709/228 |
| 2008/0301675 A1* | 12/2008 | Cromer et al. | 718/1 |
| 2009/0143052 A1* | 6/2009 | Bates et al. | 455/414.2 |
| 2009/0204957 A1* | 8/2009 | Nishibayashi et al. | 717/172 |
| 2010/0306771 A1 | 12/2010 | Kamay et al. | |
| 2011/0210972 A1 | 9/2011 | Tsirkin et al. | |
| 2012/0011193 A1 | 1/2012 | Gilboa | |
| 2012/0084774 A1 | 4/2012 | Post et al. | |

OTHER PUBLICATIONS

USPTO, Office Action for U.S. Appl. No. 13/669,575 mailed Jun. 30, 2014.
USPTO, Notice of Allowance for U.S. Appl. No. 13/669,575 mailed Oct. 10, 2014.

* cited by examiner

*Primary Examiner* — Sisley Kim
(74) *Attorney, Agent, or Firm* — Lowenstein Sandler LLP

(57) ABSTRACT

A mechanism for distributed multiple monitor display split using multiple client devices in a virtualization system is disclosed. A method of the invention includes determining, by a remote access protocol server executed by a computing device, that a monitor configuration of a primary client device is not compatible with a multiple monitor configuration of a virtual machine (VM) hosted by a hypervisor of the computing device, establishing a communication session with remote access protocol clients of multiple client devices of a logical client unit comprising the primary client device, wherein each of the multiple client devices comprises at least one monitor, and for each VM monitor of the multiple monitors configured for the VM, mapping, by the remote access protocol server, the VM monitor to a monitor of a client device in the logical client unit.

14 Claims, 6 Drawing Sheets

DISTRIBUTED MULTIPLE MONITOR DISPLAY SPLIT USING MULTIPLE CLIENT DEVICES IN A VIRTUALIZATION SYSTEM

CROSS-REFERENCE TO RELATED APPLICATIONS

The present application is related to co-filed U.S. patent application Ser. No. 13/669,575 entitled "Virtual Machine Monitor Display Split Using Multiple Client Devices in a Virtualization System.", which is assigned to the assignee of the present application.

TECHNICAL FIELD

The embodiments of the invention relate generally to virtualization systems and, more specifically, relate to a mechanism for distributed multiple monitor display split using multiple client devices in a virtualization system.

BACKGROUND

A virtual machine (VM) is a portion of software that, when executed on appropriate hardware, creates an environment allowing the virtualization of an actual physical computer system. Each VM may function as a self-contained platform, running its own operating system (OS) and software applications (processes). Typically, a hypervisor manages allocation and virtualization of computer resources and performs context switching to cycle between various VMs.

A host machine (e.g., computer or server) is typically enabled to simultaneously run multiple VMs, where each VM may be used by a local or remote client. The host machine allocates a certain amount of the host's resources to each of the VMs. Each VM is then able to use the allocated resources to execute applications, including operating systems known as guest operating systems. The hypervisor virtualizes the underlying hardware of the host machine or emulates hardware devices.

In a virtualized data center, clients may connect to VMs using a remote access protocol, such as Virtual Network Computing (VNC), Remote Desktop Protocol (RDP), Independent Computing Architecture (ICA), or Simple Protocol for Independent Computing Environments (SPICE). The remote access protocol provides client access to a remote machine display and devices (e.g., keyboard, mouse, audio) to allow the user to experience a similar interaction as with a local machine. In this topology, VMs can support single or multiple virtual monitors and the client device should be able to display these monitors. Such a configuration is typically achieved by using a client device with single or multiple monitors, respectively. However, this solution creates challenges. One challenge is the use of high resolution display in the VM when the client device has no monitor that supports this resolution. Another challenge is that the use of multiple monitors at the client device requires expensive graphics processing units (GPUs), as well as a strong client device (in terms of resources), which is not always available.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Embodiments of the invention provide a mechanism for distributed multiple monitor display split using multiple client devices in a virtualization system. A method of embodiments of the invention includes determining, by a remote access protocol server executed by a computing device, that a monitor configuration of a primary client device is not compatible with a multiple monitor configuration of a virtual machine (VM) hosted by a hypervisor of the computing device, establishing a communication session with remote access protocol clients of multiple client devices of a logical client unit comprising the primary client device, wherein each of the multiple client devices comprises at least one monitor, and for each VM monitor of the multiple monitors configured for the VM, mapping, by the remote access protocol server, the VM monitor to a monitor of a client device in the logical client unit.

Embodiments of the invention provide a mechanism for distributed multiple monitor display split using multiple client devices in a virtualization system. Embodiments of the invention utilize multiple client devices, each with a single monitor, in order to create a single logical client device. In other embodiments, the client devices are not limited to a single monitor and may support more than one monitor that is used as part of the multiple monitor display of embodiments of the invention. This single logical client device supports a VM configured with multiple monitors and serves this VM using the multiple client devices, each rendering and displaying a single display. For example, a 4-monitor VM may be served by 4 client devices forming a single logical client device, where each physical client device provides one of the monitors of the 4-monitor VM. Coordination between remote access protocol agents at each of the client devices and with a remote access protocol server enables the multiple client device display of multiple monitors in embodiments of the invention.

Figure 1:
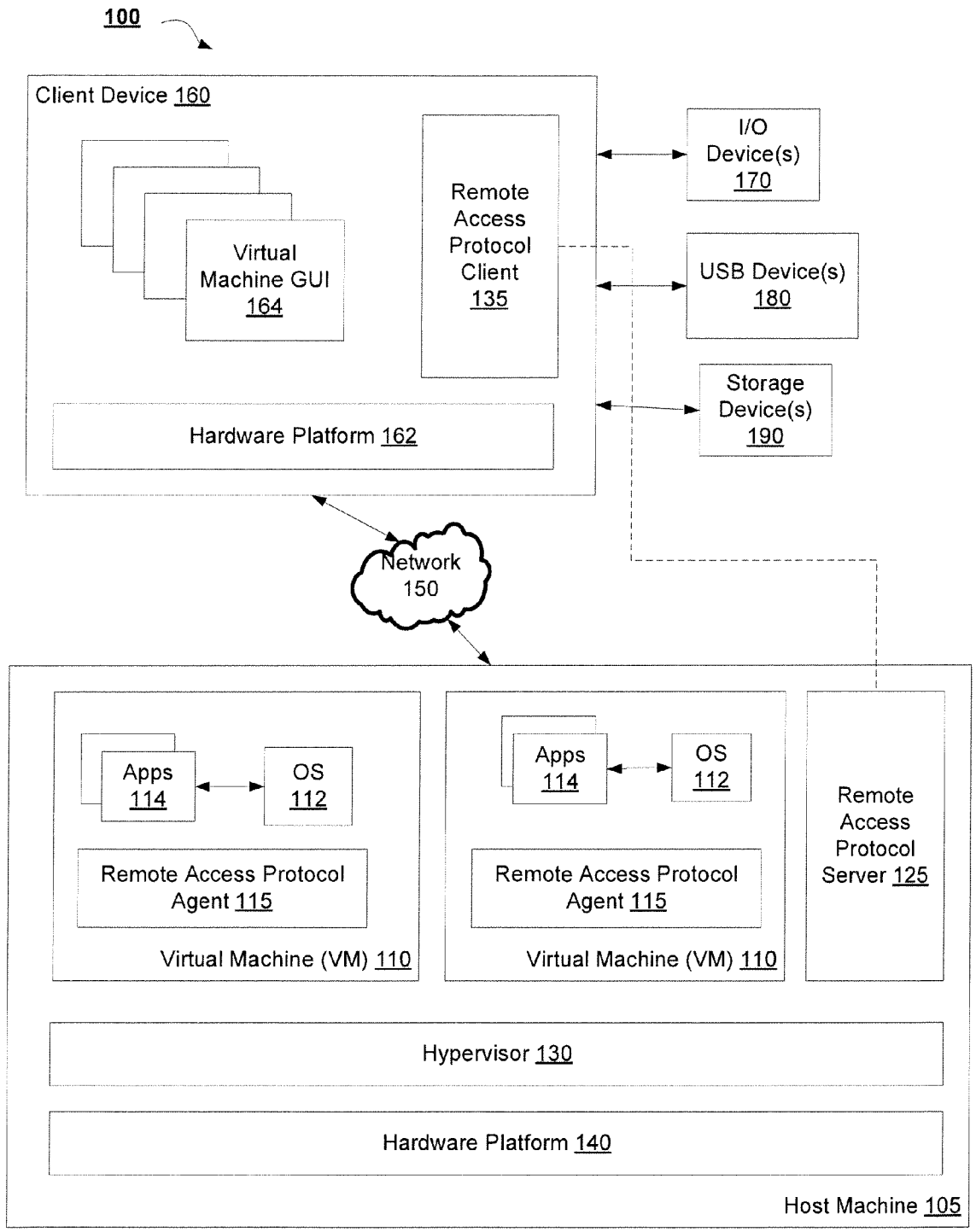
FIG. 1 is a block diagram of a virtualization system in which multiple client devices provide a distributed multiple monitor display for a virtual machine (VM) in a virtualization system according to some embodiments of the invention.

FIG. 1 is a block diagram of a virtualization system 100 in which multiple client devices provide a distributed multiple monitor display for a virtual machine (VM) in a virtualization system according to some embodiments of the invention. Referring to FIG. 1, system 100 includes, but is not limited to, a client device 160 communicatively coupled to a host machine 105 over a network 150. Although not specifically illustrated, in some embodiment more than one client device 160 is communicatively coupled to the host machine 105 over network 150. Network 150 may be a local area network (LAN) or a wide area network (WAN) and may be a combination of one or more networks. Each server is configured to host one or more virtual machines. The host machine 105 may be coupled to a host controller (not shown), via a network or directly, that manages VMs 110 hosted by the host machine 105. The host controller may be configured to add a VM, delete a VM, balance the load on a cluster of host machines that includes the host machine 105, provide directory service to the VMs 110, and perform other management functions.

Each VM 110 hosted by host machine 105 may include one or more applications 114 executed and hosted by a guest operating system (OS) 112 within the VM 110. Multiple guest OSes 112 and the associated VMs 110 may be controlled by another operating system (not shown) of the host machine 105 that runs off of a hardware platform 140 of the host machine 105. Typically, a host OS may execute a hypervisor 130 (also referred to as a virtual machine monitor (VMM)) for monitoring the hosted VMs 110. A guest OS 112 may be of the same or different type with respect to the host OS. For example, a guest OS 112 may be a Windows™ operating system from Microsoft™ and a host OS may be a Linux™ operating system available from Red Hat, Inc.™. In addition, the guest OSes 112 running on the host machine 110 may be of the same or different types.

VMs 110 may be, for example, hardware emulation, full virtualization, paravirtualization, and operating system-level virtualization VMs. Different VMs hosted by host machine 105 may have the same or different privilege levels for accessing different resources.

In one embodiment, each VM 110 hosts or maintains a desktop environment providing virtual desktops for remote clients, including client device 160. A virtual desktop can represent an output, such as virtual machine graphical user interface (GUI) 164 (e.g., an image or UI to be displayed in order to represent the VM 110 at the client device 160), generated by a desktop application running within virtual machine 110. Graphics data associated with the virtual desktop can be captured and transmitted to client device 160, where the virtual machine GUI 164 (i.e., virtual desktop) may be rendered by a rendering agent and presented by a client application.

It should be noted that functionality provided to client device 160 by VMs 110 is not limited to virtual desktops and may include a wide variety of other server-based virtualization functions made available to the clients.

In some embodiments, client-side resources also include a remote access protocol client 135 that is implemented to improve end-user experience of the virtual machine interface 164 associated with the virtual machine 110. In particular, a remote access protocol client 135 may work in tandem with a remote access protocol server 125 of the host machine 105 and a remote access protocol agent 115 of the VM 110 to determine a most efficient place to process graphics to maximize an end user experience and minimize system load. VM 110 may maintain connections with the remote rendering agent and/or the remote connection protocol agent via individual channels.

Client device 160 may further include end user devices, such as an input/output (I/O) device 170 (e.g., a display, a keyboard, a mouse), a USB device 180, or a storage device 190, etc. In one embodiment, VM 110 communicates with a remote access protocol server 125 using a multi-channel protocol (e.g., Remote Desktop Protocol (RDP™), Simple Protocol for Independent Computing Environments (SPICE™) that allows for connection between VM 110 and end-user devices 170-190 of the host machine via remote access protocol client 135 executing on client device 160. The VM 110 may include a virtual device (e.g., virtual device drivers) or a paravirtual device (e.g., using a paravirtual device drivers) for each end user device 170-190 to allow the VM 110 access to control and management functions of the end user devices 170-190.

Embodiments of the invention utilize the remote access protocol components 115, 125, 135 to provide a distributed multiple monitor display split using multiple client devices 160 in the virtualization system 100. More specifically, when a VM 110 is configured with multiple monitors, the remote access protocol server 125 directs data associated with each monitor of the VM 110 to a different client device 160. The collection of client devices may act as a single logical client for the VM 110, in order to provide the multiple monitor configuration of the VM 110.

Figure 2:
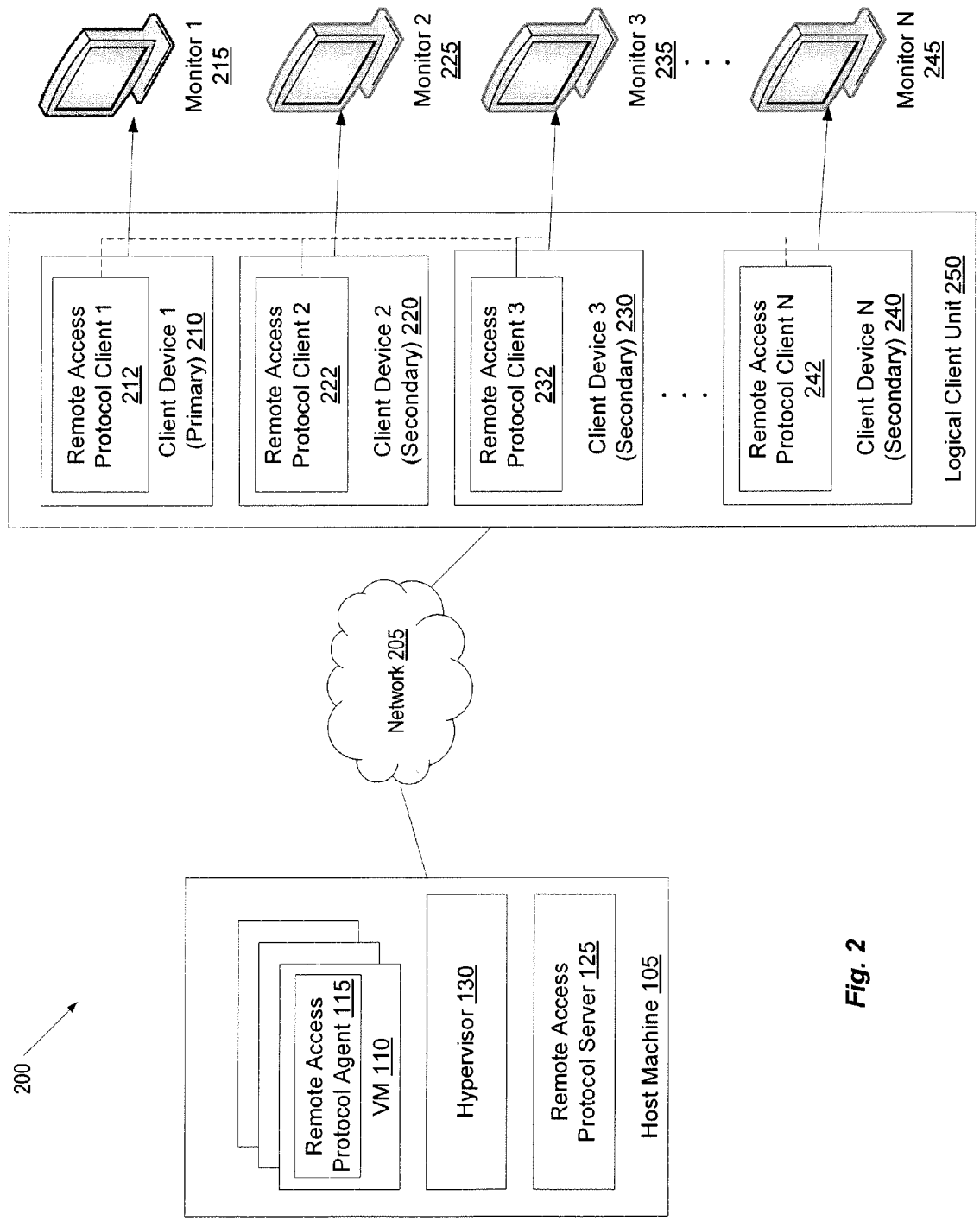
FIG. 2 is a block diagram of a virtualization system for providing a multiple monitor display split using multiple client devices according to an embodiment of the invention.

FIG. 2 is a block diagram of a virtualization system 200 for providing a multiple monitor display split using multiple client devices according to an embodiment of the invention. Virtualization system 200 includes a host machine 105 communicatively coupled to a plurality of client devices 210-240 via a network 205. Network 205 may be a local area network (LAN) or a wide area network (WAN) and may be a combination of one or more networks.

As shown, host machine 105 includes a VM 110 with a remote access protocol agent 115, a hypervisor 130, and a remote access protocol server 125. These components are the same as their counterparts described with respect to FIG. 1. In some embodiments, each client device 210-240 includes a monitor 215-245 used to render graphics for its client device 210-240. Although monitors 215-245 are illustrated as LCD monitors, one skilled in the art will appreciate that any type of monitor or client device may be used in embodiments of the invention. For example, a client device 210-240 may include, but is not limited to, a computer, a laptop, a tablet device, a mobile device, a smart phone, and any other device capable of rendering a graphics display. Each client device 210-240 also includes a remote access protocol client 212-242 that is the same as remote access protocol client 135 described with respect to FIG. 1. As mentioned above, each client device 210-240 may include more than one monitor. The illustrations and following descriptions references a single monitor at each client device 210-240 for ease of discussion and are not meant to be limited to embodiments of the invention.

In one embodiment, when VM 110 is configured with multiple monitors (e.g., 2, 3, 4, etc.), remote access protocol server 125 may gather multiple disparate client devices 210-240 to form one logical client 250 to provide the multiple monitors used to serve the VM 110 monitor configuration. To establish the multiple client device multiple monitor configuration, a first client device 1 210 is established as the primary client device. The primary client device 210 is generally the client device where a user of the VM 110 initially logs on to the VM 110 and initializes the VM 110. As part of establishing the primary client device 210, the remote access protocol client 1 212 of the primary client device 210 authenticates with the remote access protocol server 125 and a connection session is established between these two components.

Once the primary client device 1 210 is established and the VM 110 initialized, the remote access protocol server 125 may receive monitor configuration information associated with the VM from hypervisor 130. When the remote access protocol server 125 determines that the VM 110 is configured for multiple monitors and that the primary client device 210 is not configured with multiple monitors, then the remote access protocol server 125 enables the addition of other client devices 220-240 to fulfill the additional monitors for the VM 110.

In one embodiment, the remote access protocol server 125 may send a message to the remote access protocol client 1 212 informing the remote access protocol client 1 212 that additional monitors can be configured for the VM 110. The remote access protocol client 1 212 may then inform the user of the VM 110 that additional monitors may be used for the VM, and provide the user an option to select additional client devices for use of their monitors. In some embodiments, when the user indicates he or she would like to use monitors from other client devices, a user interface (UI), such as a management console, is presented to the user. Using the UI, the user of the VM 110 may identify other secondary client devices 220-240 each associated with a monitor 225-245, and indicate an arrangement of the monitors 215-245 that the user prefers (e.g., left-to-right, 2 on top and 2 on bottom, etc.). In another embodiment, a configuration manager, which is not running on the primary client device (e.g., client device 1 210), provides the user with the UI and communicates with the remote access protocol server 125 and other client devices 210-240 to configure the distribution of the virtual monitors among the client devices 210-240.

Using the identification information provided by the user, the remote access protocol client 1 212 may then connect to the remote access protocol clients 222-242 of the identified secondary client devices 220-240 and authenticate the secondary client devices 220-240 as approved for use for the multiple monitor display of the VM 110. In other embodiments, the remote access protocol clients 222-242 of the secondary client devices 220-240 may contact the remote access protocol client 1 212 of the primary client device 210 to arrange for authentication and use of the monitor 225-245 of the secondary client device 220-240.

In other embodiments, the remote access protocol client 1 212 of the primary client device 210 may determine other secondary client devices 220-240 that are near the primary client device 210 (e.g., using IP address and other geographic markers) and suggest these client devices 220-240 to the user as potential secondary client devices for monitor use purposes. In yet further embodiments, the secondary client devices 220-240 to be used with primary client device 210 are pre-configured in the remote access protocol server 125 and/or the remote access protocol client 1 212, and automatically connect as a logical client unit 250 upon initialization of the VM 110 and the primary client device 210.

In some embodiments, the authentication protocol used between the remote access protocol clients 212-242 is a proprietary authentication routine that is specialized for the remote access protocol implemented by remote access protocol server 125, remote access protocol agent 115, and remote access protocol client 212-242. Once the remote access protocol clients 222-242 have been authenticated, a communication session is established between the remote access protocol server 125 and the secondary client devices 222-242. The remote access protocol server 125 may then group the client devices 210-240 as a logical client unit 250 for purposes of distribution of monitor display data for VM 110.

In embodiments of the invention, the remote access protocol server 125 is aware of the logical client unit 250 and maintains a correspondence between each monitor of the VM 110 and the remote access protocol clients 212-242 having the client device monitor 215-245 that will display the VM monitor data. As a result, instead of transmitting all of the multiple monitor data to the same primary client device 210, the remote access protocol server 125 streams the different individual monitor data from the VM 110 to the particular remote access protocol client 212-242 associated with the monitor 215-245 that should render that VM monitor data. The remote access protocol server 125 and remote access protocol clients 212-242 should not have to synchronize the monitors 215-245 because each VM monitor is stand-alone/independent. This allows different types of clients device 210-240 (e.g., stronger processing power clients and weaker processing power clients) to be mixed together to provide a multiple monitor environment for the VM 110. In some embodiments, timestamps are taken on the remote access protocol server 125 and are used on the client devices 210-240 to display the VM monitor in synchronization.

In one embodiment, the primary client device 1 210 is responsible for all input devices (e.g., mouse, keyboard, touchscreen, etc.) and input device signals associated with the VM 110. Accordingly, while the VM 110 display spans across multiple client devices 210-240, any user inputs to the VM 110 come from a single client device (e.g., the primary client device 210).

In some embodiments, for all keyboard input, the keyboard of the primary client device 210 is assigned as the input keyboard for all of the client devices and user inputs received on this keyboard apply to all of the monitors 215-245. All keyboard events received from the VM-assigned keyboard of the primary client device 210 are sent to the VM 110 for processing, and in return, the result is sent by the VM 110 (via the remote access protocol server) to the correct client device 210-240 for display. In other embodiments, additional client devices, other than or in addition to the primary client device 210, may be considered "active" for purposes of receiving keyboard and/or mouse events. A distributed algorithm for processing mouse and keyboard events may be utilized when more than one client device 210-240 is considered active in terms of input events.

In some embodiments, keyboard events and mouse events are treated the same by the primary client device 210. In other embodiments, mouse events may be treated differently than keyboard events by the primary client device 210, as detailed below. For all mouse inputs, an interactive protocol between the remote access protocol clients 212-242 is utilized to synchronize mouse events on the client-side for a better user experience. The remote access protocol clients 212-242 of the client devices 210 may be directly connected (e.g., via a logical IP connection or TCP connection). The remote access protocol client of the primary client device 210 may then use this direct connection to transfer mouse events received at the primary client 210 from the primary client's mouse device to the other secondary client device 220-240 having the monitor 225-245 where the mouse event is being shown.

The mouse events of the primary client 210 are sent to the remote access protocol server 125. In addition, in one embodiment, once the mouse events are received by the remote access protocol client 222-242, the remote access protocol client 222-242 injects the mouse event to the client device 220-240 so that it seems as though the mouse event is coming from the real mouse of the client devices 220-240. The injection of the mouse event to the client device 220-240 may include transforming the event to the relative primitives or facilities that are native to the platform of the receiving client device 220-240. In other embodiments, the mouse event itself is not injected to the secondary clients 220-240, but the cursor icon is rendered at the appropriate location on the secondary client displays 225-245.

In some embodiments, mouse events may be handled by the remote access protocol server 125 without any client-side processing. This may be dependent upon static configuration or negotiation done between the client device 210 and remote access protocol server 125 upon session initiation. When mouse events are processed by the remote access protocol server 125, all mouse events (move, clicks, etc.) are sent to the remote access protocol server 125 for processing and in return the server sends the cursor type and position to the client device 210-240 for rendering. The server-side processing of mouse events can be sensitive to the round trip communication time between the client and server.

Figure 3:
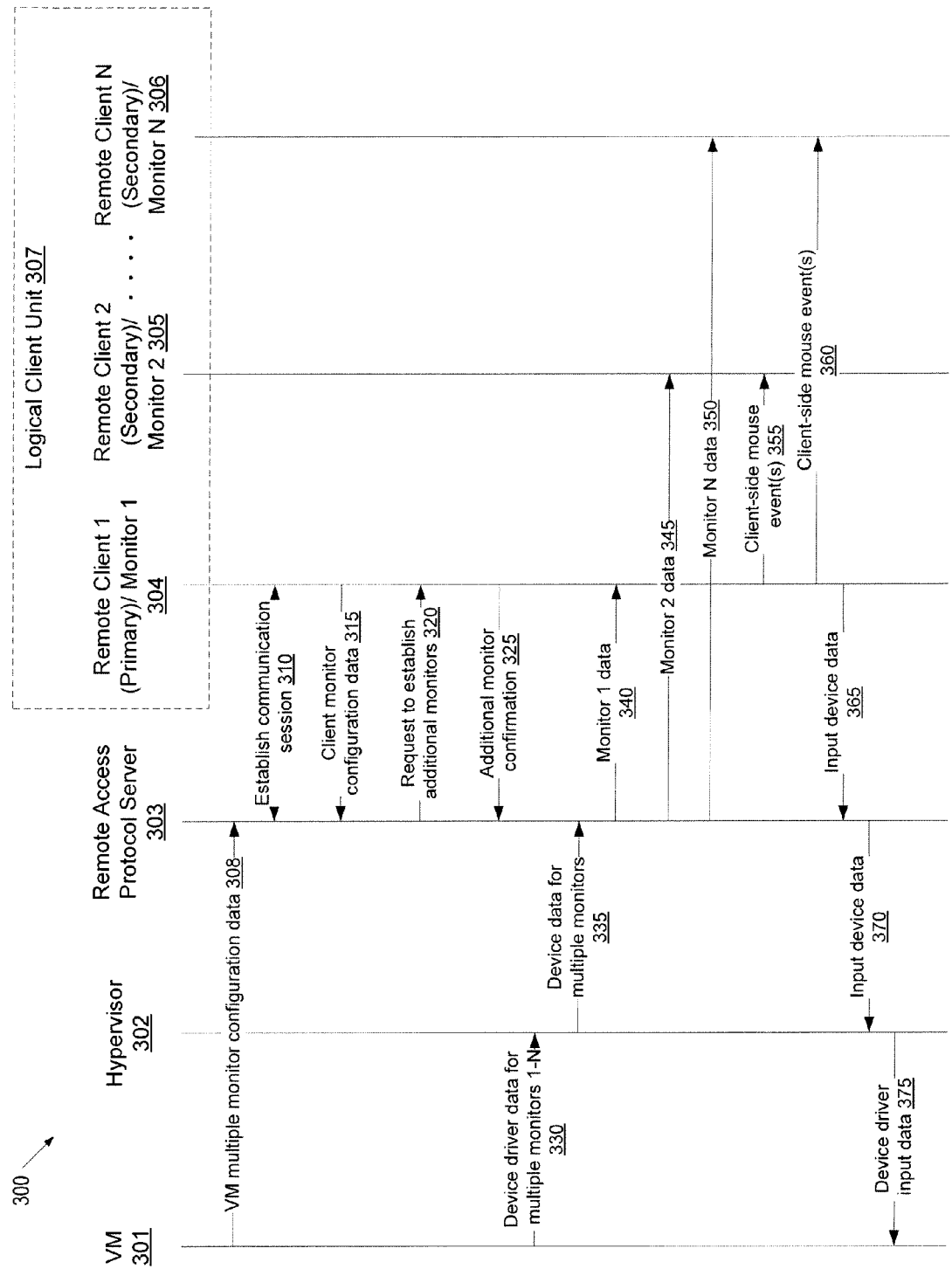
FIG. 3 is a conceptual flow diagram depicting the flow of multiple monitor configuration data using multiple client devices according to an embodiment of the invention.

FIG. 3 is a conceptual flow diagram 300 depicting the flow of multiple monitor configuration data using multiple client devices according to an embodiment of the invention. In one embodiment, communication flow 300 is shown between multiple components include a VM 301, hypervisor 302, remote access protocol server 303, a primary remote client 304, and secondary remote clients 305, 306. In one embodiment, the components 301-306 illustrated in FIG. 3 are the same as their counterpart components described with respect to FIG. 2.

The communication flow 300 illustrated in FIG. 3 is one example of the flow of multiple monitor data for a VM 301 to monitors of multiple client devices 304-306. Communication flow 300 begins when VM 301 sends configuration data 308 of its multiple monitors to a remote access protocol server 303 operating on the host machine of the VM 301. In one embodiment, the configuration data is sent via a hypervisor of the host machine to the remote access protocol server 303. The remote access protocol server 330 then establishes a communication session 310 with a primary client device 304 in order to determine a monitor configuration of the client device 304. The client device 304 sends its monitor configuration data 315 back to the remote access protocol server 303.

Based on this information, the remote access protocol server 303 determines whether the monitor configuration of the primary client device 304 is compatible with the multiple monitor configuration of the VM 301. If not, then the remote access protocol server requests 320 the primary client device 304 to establish additional monitors for displaying the VM multiple monitors. As discussed above, the primary client device 304 connects, automatically or otherwise, to other client devices 305-306 for use of their monitors. The primary client device provides confirmation 325 of the additional monitor configuration using secondary client devices 305-306, and the remote access protocol server 303 then establishes communication with the remote access protocol clients of the secondary client devices 305-306 (not shown).

The VM 301 then sends 330 device driver data for multiple monitors 1 through N 310 to hypervisor 302. The hypervisor 302 processes the received device driver data and sends out the corresponding device data for the multiple monitors 335 to the remote access protocol server 303. The remote access protocol server 303 then sends data for monitor 1 340 to the primary remote client 1 304 (which is then rendered on monitor 1), sends data for monitor 2 345 to secondary remote client 2 305 (which is then rendered on monitor 2), and so on until it sends monitor N data 350 to secondary remote client N 306 (which is then rendered on monitor N).

Communication flow 300 also illustrates one embodiments of the input device communication flow occurring for multiple client devices 304-306 used for distributed display of multiple monitors of a VM. Other embodiments may implement a different input device event communication flow, such as having each client device send input events and utilizing a distributed algorithm to synchronize such input events. A primary remote client 1 304 receives all input events from a user of the logical client unit 307 (which the multiple client devices 304-306 form).

In one embodiment, all client-side mouse events are sent 355, 360 from the remote client 1 304 to each of the secondary remote clients 305, 306. In addition, all input device data, including but not limited to all keyboard and mouse events, is sent 365 from the primary remote client 304 to the remote access protocol server 303. In some embodiments, the input events are sent to the remote access protocol server 303 prior to being sent to the secondary client devices 305, 306. After performing any remote access protocol transformations and optimizations on the received input device data, the remote access protocol server 303 sends the input device data 370 onto the hypervisor 302. The hypervisor then provides the device driver input data 375 to the VM 301 for processing.

Figure 4:
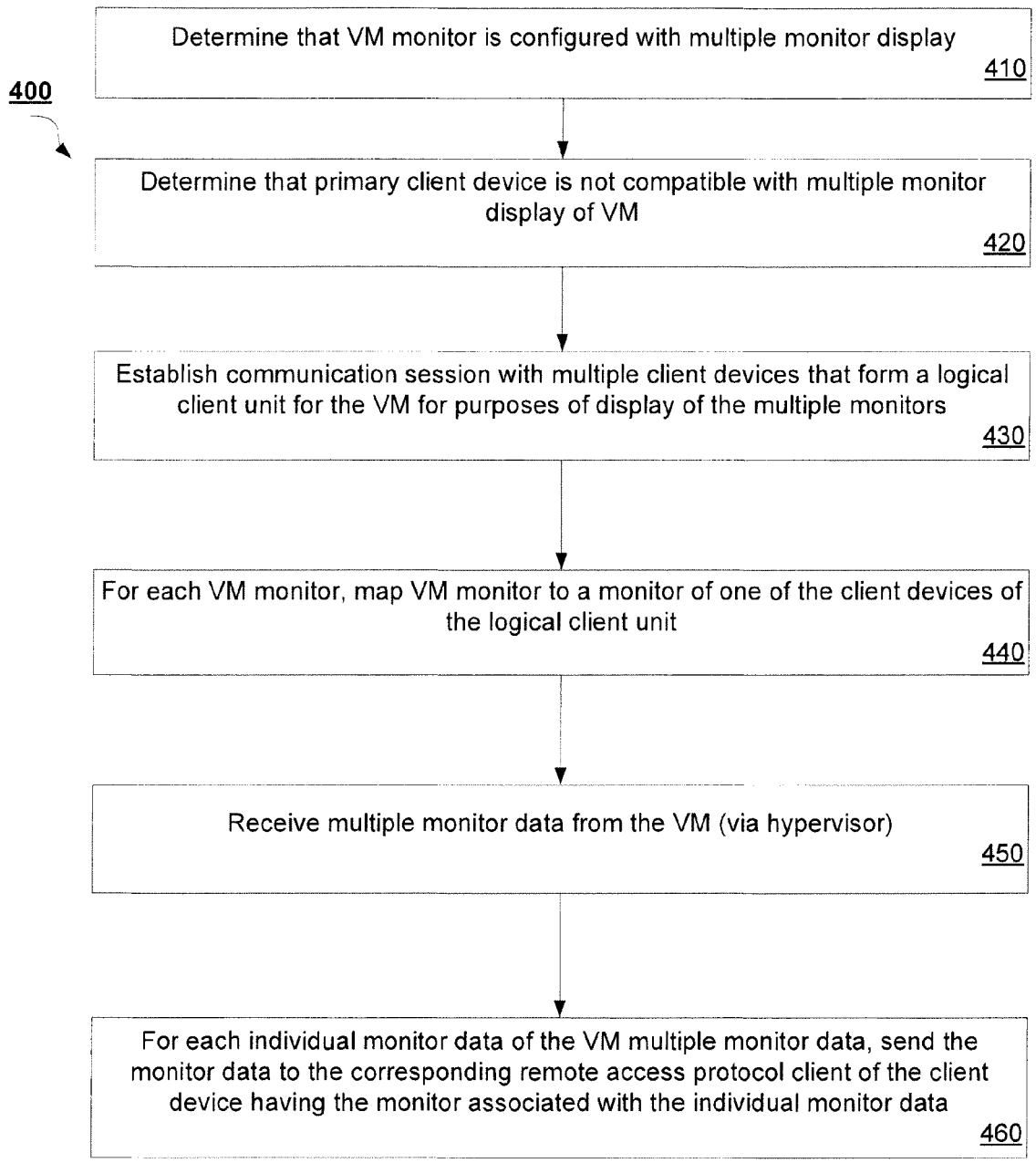
FIG. 4 is a flow diagram illustrating a method for distributed multiple monitor display split using multiple client devices in a virtualization system according to an embodiment of the invention.

FIG. 4 is a flow diagram illustrating a method 400 for distributed multiple monitor display split using multiple client devices in a virtualization system according to an embodiment of the invention. Method 400 may be performed by processing logic that may comprise hardware (e.g., circuitry, dedicated logic, programmable logic, microcode, etc.), software (such as instructions run on a processing device), firmware, or a combination thereof. In one embodiment, method 400 is performed by remote access protocol server 125 of FIG. 1.

Method 400 begins at block 410 where the remote access protocol server determines that a VM is configured with multiple monitors. In one embodiment, the remote access protocol server is provided this information by a hypervisor upon initialization of the VM by the hypervisor. At block 420, the remote access protocol server further determines that a primary client device used to render the multiple monitor display of the VM is not compatible with such a multiple monitor display.

At block 430, a communication session is established with multiple client devices that form a logical client unit for the VM. In one embodiment, the logical client unit is formed for purposes of displaying the multiple monitors of the VM using the multiple client devices of the logical client unit. The remote access protocol server may establish connections with remote access protocol clients of each client machine that forms the logical client unit.

At block 440, each monitor of the VM's multiple monitors is mapped to a monitor of a client device of the logical client unit. In one embodiment, this mapping is done in a one-to-one correspondence, so that each monitor of the client devices' in the logical client unit is associated to a single monitor of the VM's multiple monitors. Then, at block 450, data representing the multiple monitors of the VM is received from the VM. In one embodiment, the remote access protocol server receives the data from a hypervisor that virtualizes the VM on the host machine of the remote access protocol server.

Lastly, at block 460, data for each monitor of the multiple monitor data is sent to a corresponding remote access protocol client of the client device having the monitor associated with the VM monitor represented by the monitor data. In one embodiment, the mapping of VM monitors to client devices is referenced to determine which remote access protocol client the monitor data should be sent. When all VM monitor data has been sent to the corresponding client devices, those client devices can then render the monitor data to generate a distributed multiple monitor view of the VM monitors using the multiple client devices in the logical client unit.

Figure 5:
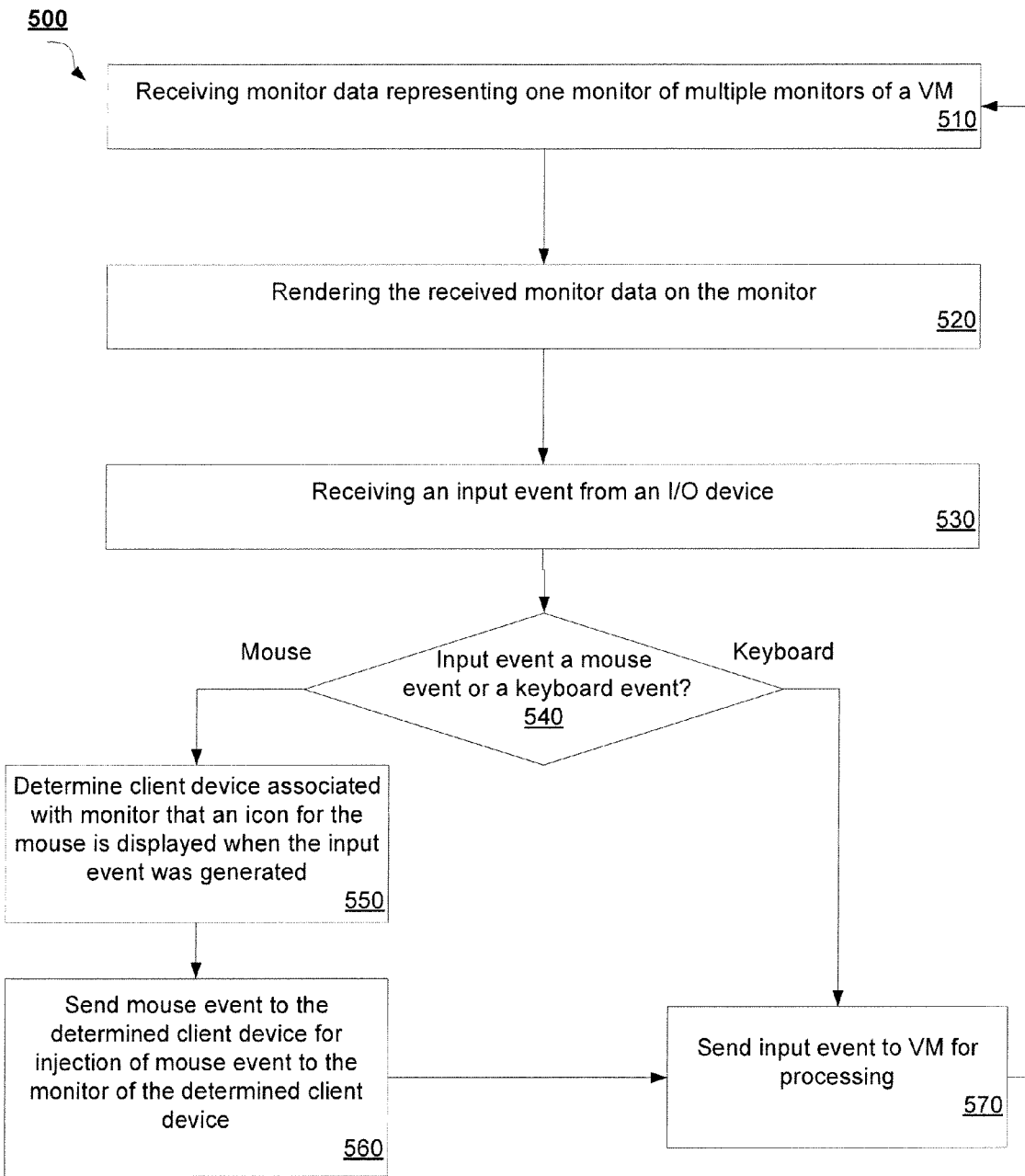
FIG. 5 is a flow diagram illustrating another method for distributed multiple monitor display split using multiple client devices in a virtualization system according to an embodiment of the invention.

FIG. 5 is a flow diagram illustrating a method 500 for distributed multiple monitor display split using multiple client devices in a virtualization system and coordination of client-side mouse events between the multiple client devices according to an embodiment of the invention. Method 500 may be performed by processing logic that may comprise hardware (e.g., circuitry, dedicated logic, programmable logic, microcode, etc.), software (such as instructions run on a processing device), firmware, or a combination thereof. In one embodiment, method 500 is performed by remote access protocol client 135 of FIG. 1 or primary remote access protocol client 212 of FIG. 2.

Method 500 begins at block 510 where monitor data is received that represents one monitor of multiple monitors configured for a VM. At block 520, the received VM monitor data is rendered on the monitor of the client device. Then, at block 530, an input event is received from an I/O device of the client device. In one embodiment, the client device is configured as a primary client device of a logical client unit for the VM, where the logical client unit consisting of multiple client devices.

At decision block 540, it is determined whether the input event is a mouse event or a keyboard event. If the input event is a keyboard event, then method 500 proceeds to block 570 where the input event is sent to the VM for processing by the VM. On the other hand, if the input event is a mouse event, then method 500 proceeds to block 550 where a client device is determined that is associated with the monitor that a representative icon for the mouse was displayed when the input event was generated.

In one embodiment, the input event may include data that indicates a location of the mouse icon when an input event (e.g., a click, a scroll, or a movement) from the mouse is received. The remote access protocol client of the primary client device may utilize this location data and correlate the location to a particular monitor of a client device in the logical client unit. For example, the remote access protocol client may maintain a mapping of monitors to display locations, and then may reference this mapping to determine the monitor where the mouse icon was located at the time of the mouse event.

At block 560, the mouse event is sent from the primary remote access protocol client to a secondary remote access protocol client associated with the determined client device where the mouse event occurred. In one embodiment, the secondary remote access protocol client can then inject the mouse event to the monitor of the associated client device. Injecting the mouse event may include transforming the event into the primitives of the particular platform of the client device. Then, method 500 proceeds to block 570 where the input event (e.g., mouse event) is sent to the VM for processing.

Figure 6:
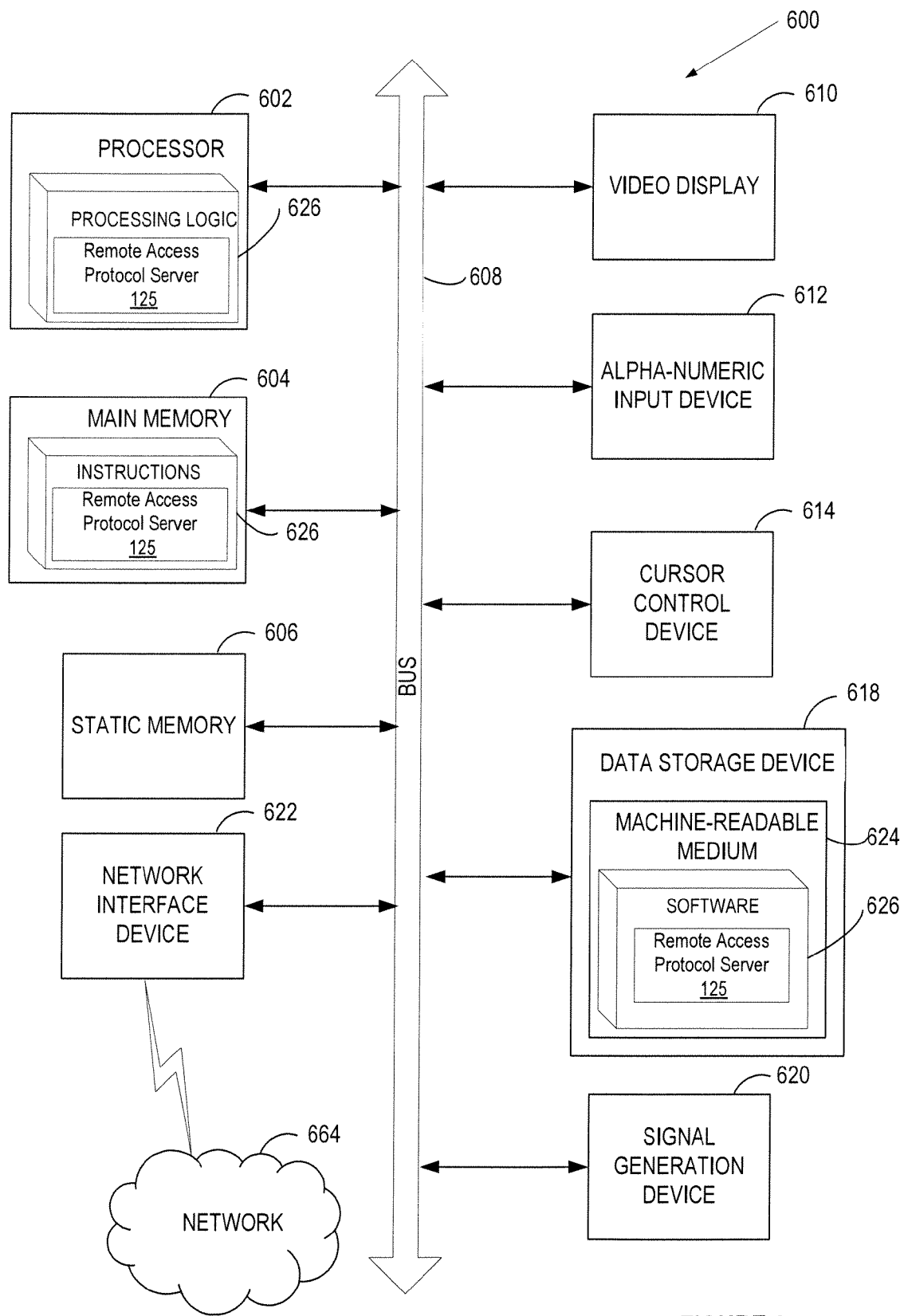
FIG. 6 illustrates a block diagram of one embodiment of a computer system.

FIG. 6 illustrates a diagrammatic representation of a machine in the example form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 600 includes a processing device 602, a main memory 604 (e.g., read-only memory (ROM), flash memory, dynamic random access memory (DRAM) (such as synchronous DRAM (SDRAM) or DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute the processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-accessible storage medium 624 on which is stored software 626 embodying any one or more of the methodologies of functions described herein. For example, software 626 may store instructions to implement a remote access protocol server 125 described with respect to FIGS. 1 and 2. The software 624 may also reside, completely or at least partially, within the main memory 604 and/or within the processing device 602 during execution thereof by the computer system 600; the main memory 604 and the processing device 602 also constituting machine-accessible storage media.

The machine-readable storage medium 628 may also be used to store instructions 626 to implement a remote access protocol server 125 to perform distributed multiple monitor display split using multiple client devices in a virtualization system described with respect to FIGS. 4 and 5, and/or a software library containing methods that call the above applications. While the machine-accessible storage medium 628 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

In the foregoing description, numerous details are set forth. It will be apparent, however, to one skilled in the art, that the disclosure may be practiced without these specific details. In some instances, well-known structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "determining", "establishing", "mapping", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method, comprising:
   determining, by a processing device of a remote access protocol server, that a monitor configuration of a primary client device separate from the processing device is not compatible with a multiple monitor configuration of a virtual machine (VM) hosted by a hypervisor executed by the processing device based on information indicating the primary client device sends its monitor configuration data back to the remote access protocol server when the VM sends configuration data corresponding to the multiple monitor configuration of the VM to the remote access protocol server;
   establishing, by the remote access protocol server, a communication session with remote access protocol clients of multiple client devices of a logical client unit comprising the primary client device, wherein each of the multiple client devices comprises at least one monitor;
   for each VM monitor of the multiple monitors configured for the VM, mapping, by the remote access protocol server, the VM monitor to a monitor of a client device in the logical client unit;
   receiving data representing the multiple monitors of the VM;
   separating the data representing the multiple monitors of the VM into individual monitor data for each VM monitor of the multiple monitors of the VM;
   identifying, by referencing the mapping of VM monitors to client device monitors, the client device that is associated with each VM monitor of the multiple monitors of the VM, wherein the identifying the client device that is associated with each VM monitor further comprises referencing a mapping of VM monitors to the multiple client devices; and
   for each individual monitor data, sending the individual monitor data to the identified client device associated with the VM monitor represented by the individual monitor data.

2. The method of claim 1, wherein the sending comprises transmitting the individual monitor data to a remote access protocol client executing on the client device receiving the individual monitor data.

3. The method of claim 1, wherein one of the multiple client devices is designated as a primary client device of the logical client unit.

4. The method of claim 3, wherein the primary client device is to manage input/output (I/O) devices for the VM by:
   receiving input events from the I/O devices; and
   sending the input events to the VM for processing by the VM.

5. The method of claim 3, wherein the primary client device manages input/output (I/O) devices for the VM by:
   receiving a event from a device of the I/O devices;

determining one of the multiple client devices where an icon representing the device was located when the event was generated; and sending the event to the determined one of the multiple client devices.

6. The method of claim 5, wherein the determined one of the multiple client devices renders the event on a monitor of the client device by transforming the event into primitive of a platform of the determined one of the multiple client devices.

7. A system, comprising:

a memory;

a processing device communicably coupled to the memory; and a remote access protocol server executable from the memory by the processing device, the remote access protocol server to:

determine that a monitor configuration of a primary client device separate from the system is not compatible with a multiple monitor configuration of a virtual machine (VM) hosted by a hypervisor executable from the memory by the processing device based on information indicating the primary client device sends its monitor configuration data back to the remote access protocol server when the VM sends configuration data corresponding to the multiple monitor configuration of the VM to the remote access protocol server;

establish a communication session with remote access protocol clients of multiple client devices of a logical client unit comprising the primary client device, wherein each of the multiple client devices comprises at least one monitor;

for each VM monitor of multiple monitors configured for the VM, mapping the VM monitor to a monitor of a client device in the logical client unit;

receive data representing the multiple monitors of the VM;

separate the data representing the multiple monitors of the VM into individual monitor data for each VM monitor of the multiple monitors of the VM;

identify, by referencing the mapping of VM monitors to client device monitors, the client device that is associated with each VM monitor of the multiple monitors of the VM, wherein the identifying the client device that is associated with each VM monitor further comprises referencing a mapping of VM monitors to the multiple client devices; and for each individual monitor data, sending the individual monitor data to the identified client device associated with the VM monitor represented by the individual monitor data.

8. The system of claim 7, wherein the sending comprises transmitting the individual monitor data to a remote access protocol client executing on the client device receiving the individual monitor data.

9. The system of claim 7, wherein one of the multiple client devices is designated as a primary client device of the logical client unit.

10. The system of claim 9, wherein the primary client device manages input/output (I/O) devices for the VM by:

receiving input events from the I/O devices; and sending the input events to the VM for processing by the VM.

11. The system of claim 9, wherein the primary client device manages input/output (I/O) devices for the VM by:

receiving a event from a device of the I/O devices;

determining one of the multiple client devices where an icon representing the device was located when the event was generated; and sending the event to the determined one of the multiple client devices.

12. A non-transitory machine-readable storage medium including instructions that, when accessed by a processing device of a remote access protocol server, cause the processing device to:

determine by the processing device, that a monitor configuration of a primary client device separate from the processing device is not compatible with a multiple monitor configuration of a virtual machine (VM) hosted by a hypervisor executed by the processing device based on information indicating the primary client device sends its monitor configuration data back to the remote access protocol server when the VM sends configuration data corresponding to the multiple monitor configuration of the VM to the remote access protocol server;

establish, by the processing device, a communication session with remote access protocol clients of multiple client devices of a logical client unit comprising the primary client device, wherein each of the multiple client devices comprises at least one monitor;

for each VM monitor of multiple monitors configured for the VM, map by the remote access protocol server, the VM monitor to a monitor of a client device in the logical client unit;

receive data representing the multiple monitors of the VM;

separate the data representing the multiple monitors of the VM into individual monitor data for each VM monitor of the multiple monitors of the VM;

identify, by referencing the mapping of VM monitors to client device monitors, the client device that is associated with each VM monitor of the multiple monitors of the VM, wherein the identifying the client device that is associated with each VM monitor further comprises referencing a mapping of VM monitors to the multiple client devices; and for each individual monitor data, sending the individual monitor data to the identified client device associated with the VM monitor represented by the individual monitor data.

13. The non-transitory machine-readable storage medium of claim 12, wherein the processing device to send further comprises the processing device to transmit the individual monitor data to a remote access protocol client executing on the client device receiving the individual monitor data.

14. The non-transitory machine-readable storage medium of claim 12, wherein one of the multiple client devices is designated as a primary client device of the logical client unit, the primary client device to manage input/output (I/O) devices for the VM by:

receiving input events from the I/O devices; and sending the input events to the VM for processing by the VM.

* * * * *